United States Patent
Saito

(10) Patent No.: US 7,506,639 B2
(45) Date of Patent: Mar. 24, 2009

(54) DIAGNOSTIC CONTROL DEVICE FOR A HYBRID VEHICLE

(75) Inventor: Yoichi Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/751,986

(22) Filed: May 22, 2007

(65) Prior Publication Data

US 2007/0267232 A1 Nov. 22, 2007

(30) Foreign Application Priority Data

May 22, 2006 (JP) ............................. 2006-141938

(51) Int. Cl.
*F02M 33/02* (2006.01)
(52) U.S. Cl. ..................... 123/520; 123/518; 123/519; 701/29; 701/103; 180/65.2
(58) Field of Classification Search ............. 123/198 D, 123/518–520, 698; 180/65.2; 701/29, 103
See application file for complete search history.

(56) References Cited

U.S. PATENT DOCUMENTS

| | | | |
|---|---|---|---|
| 6,594,562 B2 * | 7/2003 | Kaiser et al. .................. | 701/29 |
| 6,769,419 B2 * | 8/2004 | Kanai et al. .................. | 123/520 |
| 7,185,641 B2 * | 3/2007 | Suzuki ........................ | 123/520 |
| 7,347,193 B2 * | 3/2008 | Esteghlal et al. ............ | 123/520 |
| 7,347,194 B2 * | 3/2008 | Sato ........................... | 123/520 |

FOREIGN PATENT DOCUMENTS

| | | |
|---|---|---|
| JP | 2001-329895 A | 11/2001 |
| JP | 2001-329917 A | 11/2001 |

* cited by examiner

*Primary Examiner*—Stephen K Cronin
*Assistant Examiner*—Keith Coleman
(74) *Attorney, Agent, or Firm*—Haynes and Boone, LLP

(57) ABSTRACT

A diagnostic control device for a hybrid vehicle is provided for shortening the time required for a failure diagnosis of an evaporation purge system. After introducing the inlet-pipe's negative pressure into the evaporation purge system 51, the evaporation control unit 52 diagnoses failure states concerning the evaporation purge system 51 such as a leak by detecting changes in inner tank pressure over a prescribed time. In order to shorten such failure diagnosis control time, a motor generator 12 is driven to assist the engine when introducing the inlet-pipe's negative pressure into the evaporation purge system 51. With such assist-driving, it becomes possible to reduce engine load, therefore, the throttle valve 67 of the engine 11 can be controlled to be on the closed side, making it possible to create sufficient inlet-pipe's negative pressure. Through this, the pressure in the evaporation purge system 51 can be decreased quickly, which shortens the time for failure diagnosis in the evaporation purge system 51.

2 Claims, 7 Drawing Sheets

DIAGNOSTIC CONTROL DEVICE FOR A HYBRID VEHICLE

CROSS REFERENCE TO RELATED APPLICATIONS

This application claims priority under 35 U.S.C. 119 based upon Japanese Patent Application Serial No. 2006-141938, filed on May 22, 2006. The entire disclosure of the aforesaid application is incorporated herein by reference.

FIELD OF THE INVENTION

This invention relates to a diagnostic control device for a hybrid vehicle having an engine with an electric motor coupled to the engine, and more specifically to an effective technology for performing failure diagnostic control of an evaporation process mechanism that processes fuel vapor.

BACKGROUND OF THE INVENTION

In order to appropriately process fuel vapor generated in a fuel tank, an evaporation process mechanism (referred to as an evaporation purge system hereafter) is installed in the fuel system of a vehicle, such that fuel vapor is burned within cylinders. This evaporation purge system contains a canister in which activated carbon is sealed. After being captured by the canister, the fuel vapor generated in the fuel tank is supplied from the canister to the inlet pipe of the engine through a purge path. Furthermore, the purge path that guides fuel vapor to the inlet pipe has a purge control-valve, and by controlling the opening and closing of this purge control-valve the fuel vapor amount that is supplied to the inlet pipe can be controlled (for example, see JP Tokkai Publication No. 2001-329917 and JP Tokkai Publication No. 2001-329895).

Furthermore, in order to process fuel vapor reliably without releasing it to the outside, the evaporation purge system incorporates a diagnostic system which detects a fuel vapor leak from the fuel tank, purge path, and canister, etc. After introducing the inlet pipe's negative pressure into the evaporation purge system, such a diagnostic system determines the presence or absence of a fuel vapor leak by detecting pressure changes in the evaporation purge system over a prescribed time. Furthermore, since a large change in running condition affects failure diagnostic control, failure diagnostic control is performed when a running condition is kept constant. Therefore it is often reset when a running condition changes significantly.

SUMMERY OF THE INVENTION

However, a hybrid vehicle is often installed with a small engine with a small displacement, or a high expansion ratio engine that blows back intake air. It is difficult for such a small engine or a high expansion ratio engine to create a large negative pressure in the inlet pipe due to their small intake air volume, which causes a delay in diagnosis time in their evaporation purge systems. In other words, it is necessary to introduce negative pressure in the inlet pipe in order to lower the pressure into the evaporation purge system when executing a failure diagnostic-control; however, it requires a long suction time in order to lower the pressure in the evaporation purge system with a small negative pressure in the inlet pipe.

As described, if the diagnosis time of the evaporation purge system is prolonged, it is affected by changes in driving conditions. Thus a failure diagnostic control is more prone to resets. In particular if the resetting of the failure diagnostic control is repeated, the failure diagnostic control is executed many times. Since fuel vapor cannot be processed while the failure diagnostic control is performed, there is a need for avoiding resets of the failure diagnostic control by way of shortening the diagnosis time.

Thus, a purpose of the present invention is shortening the failure diagnosis time of the evaporation process mechanism.

The present invention is a diagnostic control device for a hybrid vehicle having an engine with an electric motor coupled to the engine, wherein the engine contains an induction system having an inlet pipe and is connected to a fuel tank, comprising;

an evaporation process mechanism for guiding fuel vapor generated in the fuel tank through a vapor flow path to the induction system of the engine; a failure diagnosis unit that introduces negative-pressure of the inlet-pipe into the vapor flow path of the evaporation process mechanism for performing a failure diagnosis of the evaporation process mechanism based on pressure changes in the vapor flow path; and a motor control unit for driving the electric motor to assist the engine so as to relieve engine load when introducing negative-pressure of the inlet pipe into the vapor flow path.

According to another aspect of the present invention, the motor control unit prohibits driving of the electric motor to assist the engine when the charge state of an electric storage device that supplies electric-power to the electric motor goes below a prescribed value.

In yet another aspect of the present invention, the motor control unit prohibits driving of the electric motor to assist the engine when the inlet-pipe's negative pressure obtained by the engine alone goes below a prescribed assist threshold-value.

In still another aspect of the present invention, the motor control unit makes the electric motor drive for electricity generation when the inlet-pipe's negative pressure obtained by the engine alone goes below a power-generation threshold-value which is on a lower side of the prescribed assist threshold-value.

According to the present invention, when introducing negative pressure in the inlet pipe into a vapor path, engine load is reduced by the driving of an electric motor to assist the engine, which brings down the negative pressure of the inlet pipe, making it possible to shorten the failure diagnostic time for the evaporation handling mechanism.

DETAILED DESCRIPTION OF THE INVENTION

Hereafter embodiments of the present invention are explained in detail, referring to the attached figures. FIG. 1 is a skeleton diagram showing a power unit 10 that is installed in a hybrid vehicle. As shown in FIG. 1, the power unit 10 is equipped with an engine 11 and a motor generator (electric motor) 12 as power sources, and a transmission 13 is installed on the posterior side of the motor generator 12. The power outputted from the engine 11 and motor generator 12 is distributed to each of driving wheels via a plurality of differential mechanisms 16 and 17 after shifting gears via a gear mechanism 15 which is incorporated in a mission case 14.

The illustrated power unit 10 is a parallel-mode power unit, in which the engine 11 is operated as the main source of power for driving, and as a supplemental power source at times of starting and acceleration, the motor generator 12 is operated. In addition, during a deceleration or driving at a constant-speed, by making the motor generator 12 drive for electric generation, deceleration energy and surplus energy can be collected by converting the energies to electrical energy. Furthermore, by operating the motor generator 12 as a starter motor, it becomes possible to start up the engine 11's rotation by means of the motor generator 12.

The motor generator 12 installed on the rear side of the engine 11 comprises a stator 21 fixed to a motor case 20 and a rotor 23 coupled to a crankshaft 22 of the engine 11, wherein the rotor 23 is connected to a torque converter 25 via a drive plate 24. The torque converter 25 has a pump impeller 27 which is fixed to a converter case 26, and a turbine runner 28 facing this pump impeller 27; and power is transmitted to the turbine runner 28 from the pump impeller 27 via hydraulic oil in the torque converter 25.

In addition, a gear mechanism 15 having an epicyclic gear train, clutch, brake, etc. is coupled to the torque converter 25 via a gear input shaft 30. By selectively engaging the clutch or brake in the gear mechanism 15, it becomes possible to switch power transmission paths in the gear mechanism 15 for shifting gears. Furthermore, between a gear output shaft 31 and a rear-wheel output shaft 32, a center differential mechanism 16 in an epicyclic gearing mode which distributes driving torque to the front and rear wheels is mounted, and through this center differential mechanism 16, power is distributed between the front wheel output shaft 33 and the rear-wheel output shaft 32.

This kind of hybrid vehicle carries a high voltage battery 40 (for example, lithium ion battery) which supplies electric power to the motor generator 12. This high voltage battery 40 is connected to a battery control unit 41 which controls the amounts of charging and discharging in the high voltage battery 40, as well as calculating the state of charge (SOC) based on voltage, current, cell temperature, etc. In addition, the hybrid vehicle carries an engine control unit 42, which outputs control signals to a throttle valve, injector, and igniter, etc. Furthermore, the hybrid vehicle carries a hybrid control unit 43, which outputs drive signals to the motor generator 12. These control units 41-43 comprise CPUs that computes control signals; ROMs for storing control programs, computation equations, and map data, etc.; and RAMs for storing data temporarily. In addition, the control units 41-43 are connected to each other via a communications network so that various information can be shared among the control units 41-43.

In addition, an inhibitor switch 44 for detecting the operating range of a select lever, an accelerator pedal sensor 45 for detecting the state of pressing of an accelerator pedal, and a brake pedal sensor 46 for detecting the state of pressing of a brake pedal are connected to the hybrid control unit 43. Furthermore, an inverter 47 is connected to the hybrid control unit 43, and by controlling the current value and frequency of the alternating-current via the inverter 47 it becomes possible to control the motor torque and the motor revolution of the motor generator 12 which is an alternating current synchronism type motor. Furthermore, the hybrid control unit 43 determines the condition of the vehicle based on various information inputs from the control units 41 and 42 and the sensors 44-46, and at the same time, controls outputting control signals to the inverter 47, engine control unit 42, and battery control unit 41 to make the motor generator 12, the engine 11, and the high voltage battery 40 cooperate with each other.

The following section explains the evaporation process mechanism 51 (referred to as the evaporation purge system hereafter), which processes fuel vapor generated in the fuel tank 50 by supplying it to the engine 11. FIG. 2 is a schematic diagram, showing the evaporation purge system 51, which is controlled based on the control signals from an evaporation control unit 52. Furthermore, like the previously described control units 41-43, the evaporation control unit 52 also consists of a CPU, ROM, and RAM, etc. and is connected mutually with each of the control units 41-43 via the communications network.

As shown in FIG. 2, an evaporation piping 53 is connected to the fuel tank 50 that retains fuel such as gasoline, wherein the fuel vapor generated in the fuel tank 50 is guided to the canister 54 via the evaporation piping 53. Within the canister 54, activated carbon that adsorbs fuel vapor is sealed, making it possible to capture fuel vapor in the canister 54 when fuel vapor is sent to the canister 54. In addition, the evaporation piping 53 is equipped with a pressure regulating valve 55, the opening and closing of which is controlled by the evaporation control unit 52, and this pressure regulating valve 55 is controlled based on the pressure in the fuel tank 50 detected by means of a pressure sensor 56. In addition, the fuel tank 50 is equipped with a fuel shut-off valve 57 which operates according to the oil level of fuel. With this fuel shut-off valve 57, the inflow of fuel to the evaporation piping 53 can be prevented when the oil level increases due to refueling.

In addition, a purge piping 61 in communication with the inlet pipe 60 of the engine 11, is connected to the canister 54, and this purge piping 61 is equipped with a purge control-valve 62, the opening and closing of which is controlled by the evaporation control unit 52. By switching this purge control-valve 62 to a communicated state, the inlet pipe 60 and canister 54 are communicated, thus when air is introduced into the canister 54 from an induction piping 63 connected to the canister 54, the fuel vapor in the canister 54 is sucked with the air toward the inlet pipe 60. In other words, by controlling the communication state between the canister 54 and the inlet pipe 60 with the purge control-valve 62, it becomes possible to control the amount of fuel vapor supplied to the engine 11. In addition, a negative pressure sensor 64 is installed on the inlet pipe 60 which constitutes the induction system of engine 11. This negative pressure sensor 64 outputs signals which indicate the inlet-pipe's negative pressure to the engine control unit 42.

In order to operate this kind of evaporation purge system 51 properly, it is necessary to confirm that no fuel vapor is leaking out from the evaporation purge system 51. Thus the evaporation control unit 52 which functions as a failure diagnostic control executes a failure diagnostic control as explained below. FIG. 3 is a line diagram showing the pressure in the fuel tank 50 as it varies with the execution of the failure diagnostic control.

As shown in FIG. 3, the failure diagnostic control executed by the evaporation control unit 52 has four diagnosis phases. At first, in diagnosis phase PH1, by opening the purge control-valve 62 and pressure adjustment valve 55 while the canister valve 65 installed in the induction piping 63 is closed, the inlet-pipe's negative pressure is introduced into the vapor flow path of the evaporation purge system 51 that consists of the fuel tank 50, evaporation piping 53, canister 54, purge piping 61, and induction piping 63. Furthermore, diagnosis phase PH1 that introduces the inlet-pipe's negative pressure continues until the pressure in the fuel tank 50 (referred to as inner tank pressure hereafter) goes below a target pressure. However, if the target negative-pressure is not reached after the elapse of a prescribed time, it is judged that a large leak like a removal of a tank cap 66 has occurred, or the purge control valve or canister valve has been damaged. In addition, if the inner tank pressure goes significantly under the target negative-pressure, it is judged that the purge control-valve 62 is firmly fixed at a full open position.

When the inner tank pressure goes below the target negative pressure by the introduction of inlet-pipe's negative pressure, it advances to diagnosis phase PH2, where the purge control-valve 62 is closed to isolate the inside of the evaporation purge system 51 as a single space. While the evaporation purge system 51 is isolated, the change of the inner tank pressure is detected over a prescribed time. If a large amount of fuel vapor is generated, or if the fuel vapor is leaking from pipes etc., a large pressure change will be detected in diagnosis phase PH2. After a prescribed time has elapsed, it advances to diagnosis phase PH3, where, by opening the canister valve 65, air is guided into the evaporation purge system 51 that has been isolated. If the rate of pressure increase in this diagnosis phase PH3 is slow, it is judged that the canister valve 65 is in a failed state of not being opened to a full open position.

After the evaporation purge system 51 is released to outside air, it advances to diagnosis phase PH4, where changes of the inner tank pressure are detected over a prescribed time while the canister valve 65 is closed. In other words, in diagnosis phase PH4, by detecting a pressure change that is greater than the atmospheric pressure, the amount of fuel vapor generated in the fuel tank 50 can be estimated. If the amount of pressure change P2 detected in diagnosis phase PH4 is under a prescribed value, and the amount of pressure change detected in diagnosis phase PH2 exceeds a prescribed value, it is judged that fuel vapor is leaking from the evaporation purge system 51. In other words, when an excessive fuel vapor generation or a fuel vapor leak is suspected because the amount of pressure increase in diagnosis phase PH2 exceeds a prescribed value, if the excessive fuel vapor generation is not recognized in diagnosis phase PH4, then, the evaporation control unit 52 judges that a leak is occurring in the evaporation purge system 51.

As explained above, after the inlet-pipe's negative pressure is introduced into the evaporation purge system 51, by detecting changes of inner tank pressure over a prescribed time, a failure state of the evaporation purge system 51 is diagnosed, but in order to increase diagnostic precision, the failure diagnostic control has to be executed in an approx. constant running condition. For example, if the running condition fluctuates greatly, it may lead to a false diagnosis; therefore, the failure diagnostic control is reset. However, if the failure diagnostic control is repeatedly reset over a long period of time, that will constrain purging process of fuel vapor, thus it is necessary to complete the failure diagnostic control promptly before the running condition changes significantly.

Therefore, the evaporation control unit 52 which functions as a motor control unit in diagnosis phase PH1, where the inlet-pipe's negative pressure is introduced, makes the motor generator 12 drive to assist the engine as follows, so that the failure diagnostic control completes promptly. FIG. 4 is a flow chart showing an execution routine of the motor drive control during the failure diagnostic control.

First, in Step S1, it is determined whether or not diagnosis phase PH1 of the failure diagnostic control has started. When it is determined that diagnosis phase PH1 has not started in Step S1, it advances to Step S2, where normal control of a motor generator 12 is executed according to the travel situation. On the other hand, if it is determined that diagnosis phase PH1 has started in Step S1, it advances to Step S3, where assist control of the motor generator 12 is executed. Execution of this assist control makes the motor generator 12 drives with extra motor torque beyond a prescribed one.

As described above, by making the motor generator 12 drive to assist the engine in diagnosis phase PH1, engine load is relieved and the inlet-pipe's negative pressure is increased, which allows the evaporation purge system 51 to reduce its internal pressure to a target pressure quickly. In other words, driving the motor generator 12 supplementally, allows the engine torque to be reduced. Consequently, the throttle valve 67 of the engine 11 can be controlled to be on the closed side without changing the running condition. Thus, it becomes possible to create sufficient negative pressure in the inlet-pipe. As a result, it becomes possible to finish diagnosis phase PH1 of the failure diagnostic control promptly, causing the failure diagnosis time to be shortened. Thus the resetting of the failure diagnostic control is evaded to a minimal.

In the flow chart shown in FIG. 4, if diagnosis phase PH1 has started, the assist control is carried out. However, whether or not to execute the assist-control may be determined based on a charge condition or the inlet-pipe's negative pressure. FIGS. 5-6 are flow charts showing execution routines of motor drive control executed by diagnostic control devices of other embodiments according to the present invention. In addition, the same reference numbers are given to the same Steps shown in the flowchart of FIG. 4 and their descriptions are omitted.

As shown FIG. 5, if it is determined that diagnosis phase PH1 has started in Step S1, it advances to Step S11, where the state of charge in the high voltage battery 40 is read. Next, if it is determined that the state of charge has exceeded a prescribed value, in the following Step S13 it is determined that diagnosis phase PH1 is to be continued, and in the following Step S3, the assist control of the motor generator 12 is executed. On the other hand, if it is determined that the state of charge has gone below a prescribed value in Step S12, the suspension of diagnosis phase PH1 is determined in the following Step S14, and in the following Step S15 the electric power generation control of the motor generator 12 is executed. As described above, if the state of charge is less than a prescribed value, diagnosis phase PH1 is stopped, and at the same time, the motor generator 12 is driven to generate electricity. Thus, it becomes possible to generate sufficient negative pressure in the inlet-pipe without causing a shortage of electric power during the execution of the assist control. By doing so, diagnosis phase PH1 of the failure diagnostic control can be completed quickly, thus shortening the failure diagnosis time.

Furthermore, the determination of whether or not to execute assist control may also be based on the inlet-pipe's negative pressure, instead of basing it on the state of charge. As shown in FIG. 6, if it is determined that diagnosis phase PH1 has started in Step S1, it advances to Step S21, where the inlet-pipe's negative pressure is read. In Step S22, if it is determined that the inlet-pipe's negative pressure has exceeded a predetermined assist threshold value, the assist control of the motor generator 12 is executed in the following Step S3. On the other hand, if it is determined that the inlet-pipe's negative pressure is less than the assist threshold value in Step S22, a normal control of the motor generator 12 is executed in the subsequent Step S23. As described above, if it is determined that the inlet-pipe's negative pressure is less than an assist threshold value, that is, the engine alone can secure a sufficient inlet-pipe's negative pressure, the assist control of the motor generator 12 is prohibited. Thus the power consumption of the high voltage battery 40 can be reduced.

In addition, rather than determining only whether or not to execute the assist control based on the inlet-pipe's negative pressure, the determination of whether or not to execute electric power generation control can also be based on the inlet-pipe's negative pressure. As shown in FIG. 7, if it is determined that diagnosis phase PH1 has started in Step S1, it advances to Step S21, where the inlet-pipe's negative pressure is read. And if it is determined that the inlet-pipe's negative pressure has exceeded an assist threshold value in Step S22, in the subsequent Step S3 the assist control of motor generator 12 is executed. On the other hand, if it is determined in Step 22 that the inlet-pipe's negative pressure is less than the assist threshold value, then it advances to Step S31, where it is determined whether the inlet-pipe's negative pressure is less than a power generation threshold value. The power generation threshold value is set on the lower pressure side with regard to the assist threshold value. In Step S31, if it is determined that the inlet-pipe's negative pressure is lower than the power generation threshold value, it means that sufficient inlet-pipe's negative pressure has already been secured but the driving condition of the engine 11 has a load that is too low to guide fuel vapor to the inlet pipe 60 of the engine 11, then, it advances to Step S32, where electric power generation control of the motor generator 12 is executed. Instead, if it is determined that the inlet-pipe's negative pressure exceeds the power generation threshold value in Step S31, it means that appropriate inlet-pipe's negative pressure has been maintained, thus it advances to Step S33, where normal control of the motor generator 12 is executed.

As described above, if it is determined in Step S31 that the inlet-pipe's negative pressure is below the power generation threshold value which is on the lower pressure side, and greater than necessary inlet-pipe's negative pressure can secured by the engine alone, that is, even if the inlet-pipe's negative pressure were to be increased, there would be no effect on the failure diagnosis time, then electric power generation control of the motor generator 12 is executed by engine power. By doing so, engine power can be used effectively, allowing improved energy efficiency for the hybrid car, while at the same time, preventing poor combustion in the engine 11, which may occur if fuel vapor is supplied when the load on the engine 11 is too low.

It is to be understood that the present invention is not to be limited to the above-mentioned embodiments, and various changes can be made without departing from the scope of the invention. For example, the hybrid vehicle that has been illustrated is a parallel mode vehicle, but it is not limited to this type, and the diagnostic control device of the present invention may be applied to a hybrid vehicle in a series mode or a series/parallel mode.

Furthermore, as an engine mounted on a hybrid vehicle, it is not limited to a small engine with a small displacement, or an engine with a high expansion ratio that blows back intake air, but an engine with a large displacement can also be mounted. In addition, as for the type of engine it does not have to be limited, and it could be a horizontal-opposed engine, V-type engine, and in-line engine, etc.

In addition, as for the failure diagnostic control executed by the evaporation control unit 52, it should not be understood that it is limited to the failure diagnostic control shown in FIG. 3, and the present invention may be applied to a hybrid vehicle that executes a failure diagnostic control with other procedures.

Moreover, the high voltage battery 40 is not limited to a lithium ion battery, and it may be a NiMH battery or a capacitor.

Figure 1:
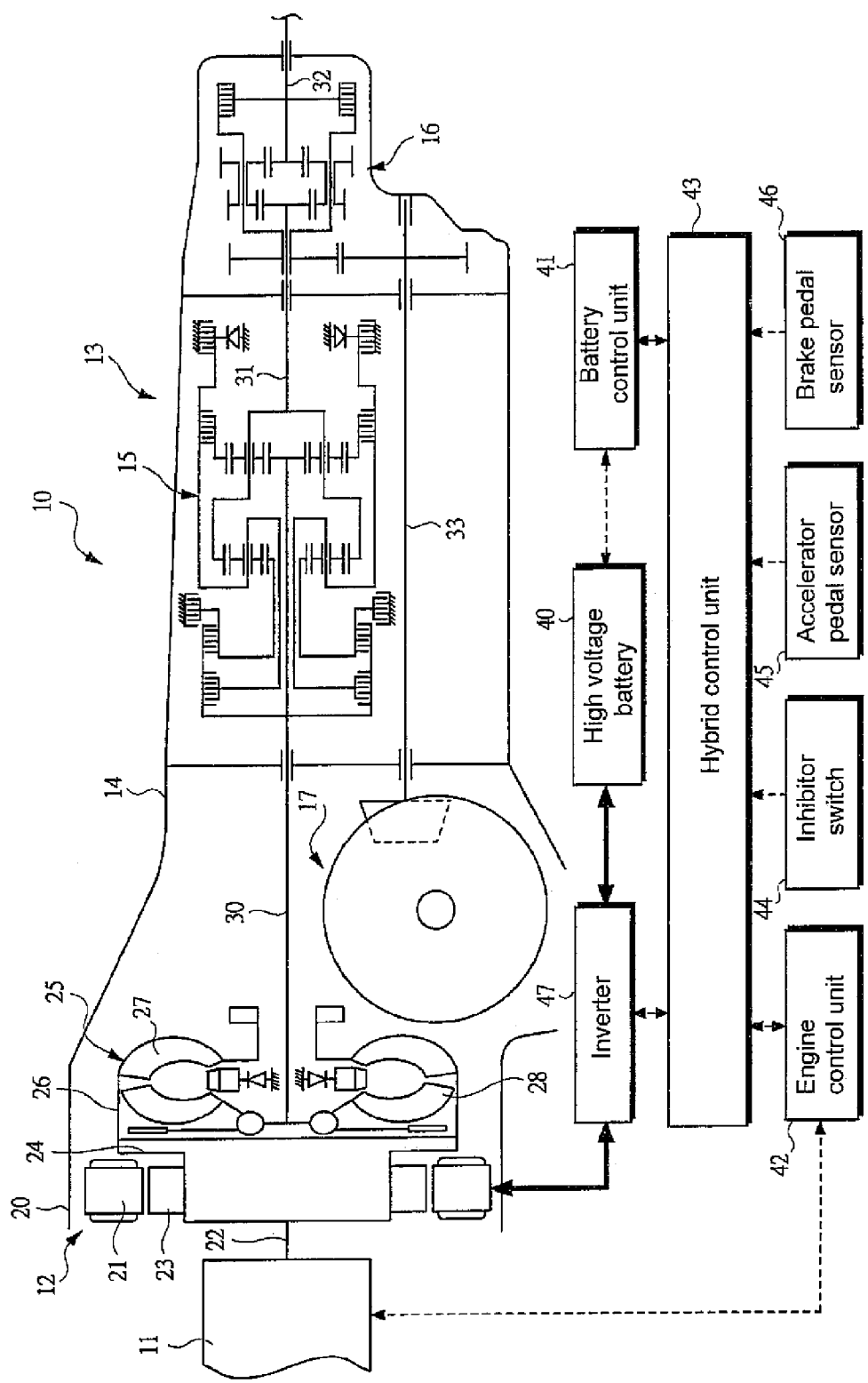
FIG. 1 is a skeleton diagram of a power unit installed in a hybrid vehicle
Figure 2:
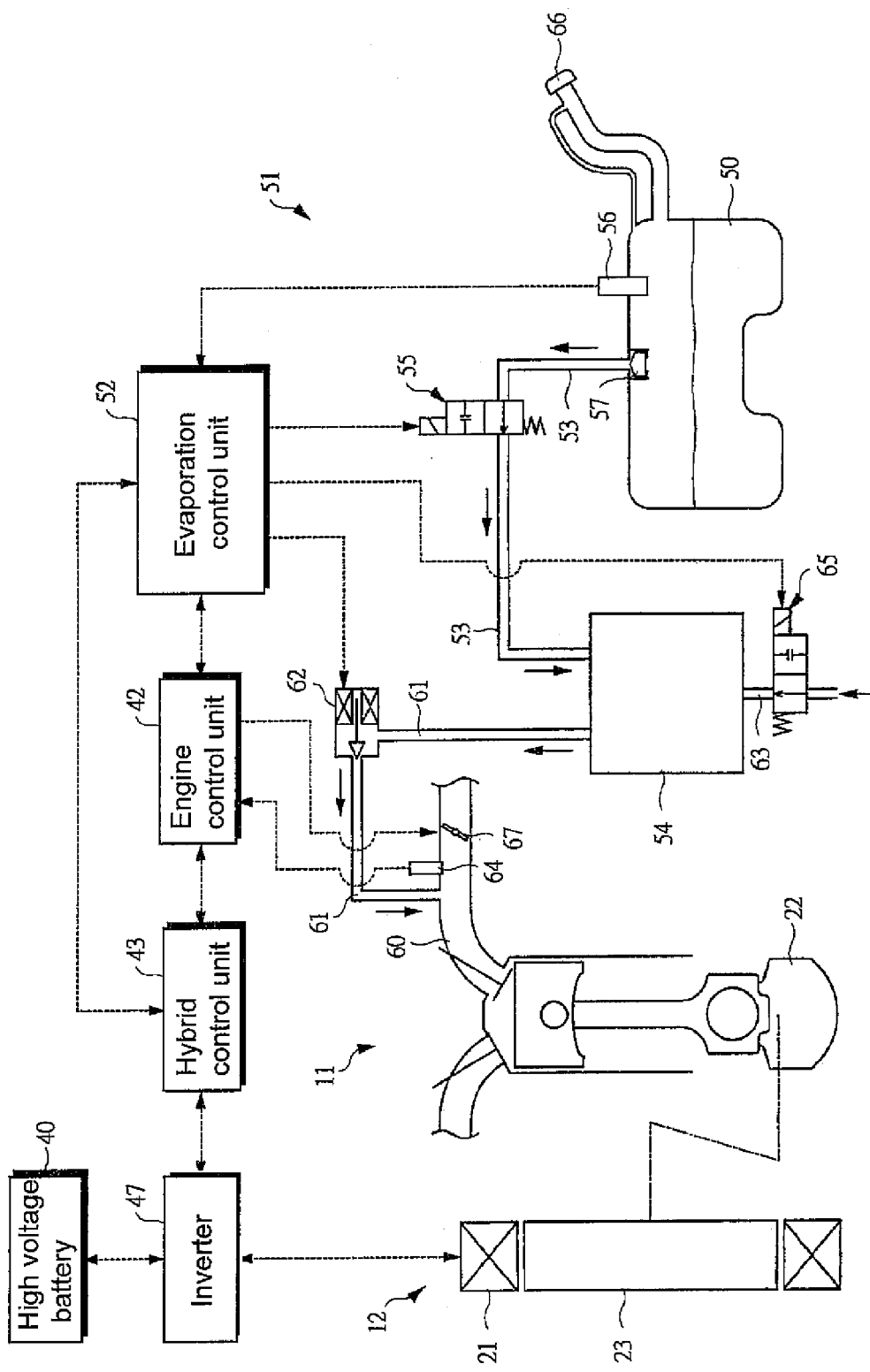
FIG. 2 is a schematic diagram showing an evaporation purge system.
Figure 3:
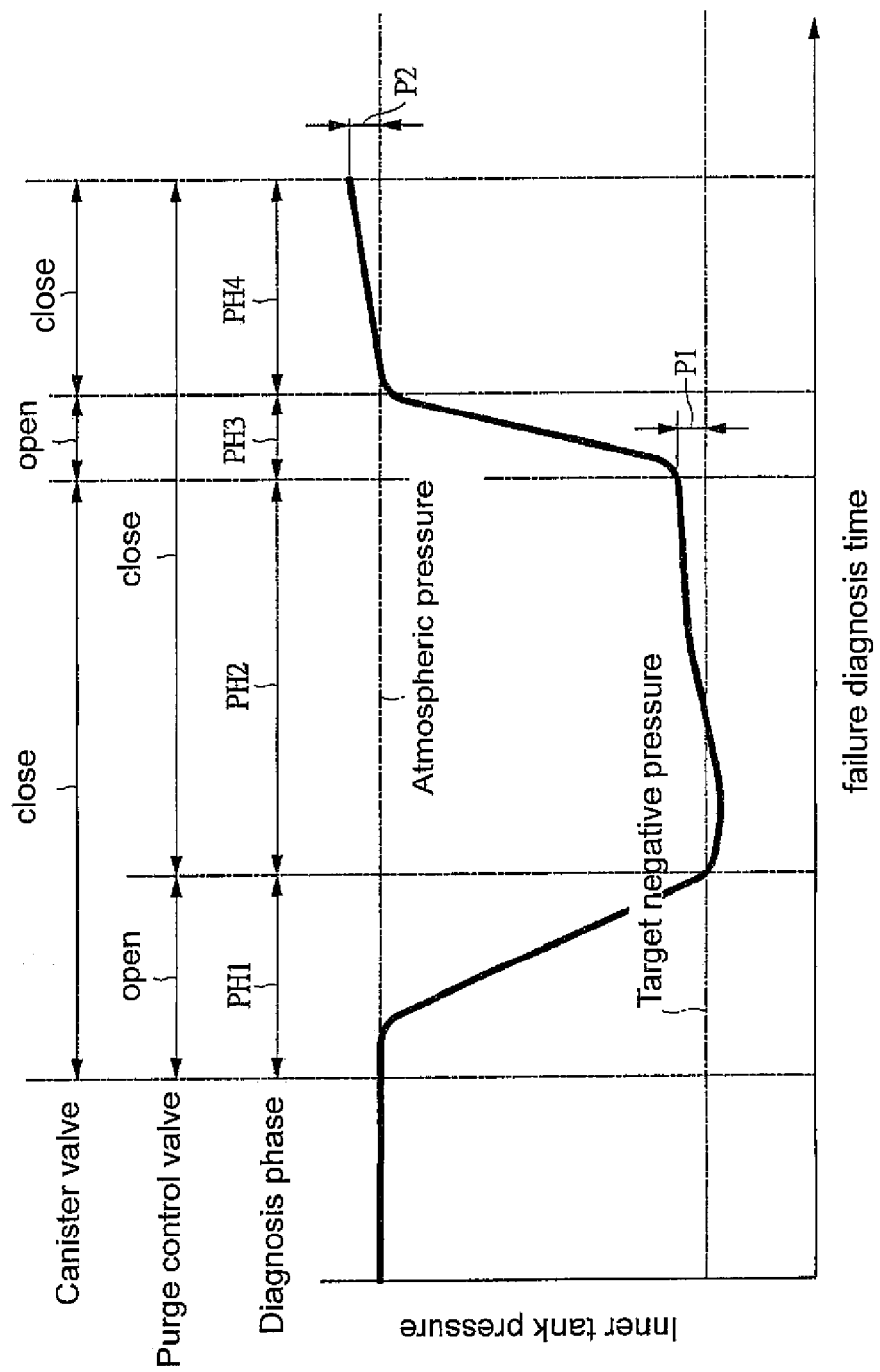
FIG. 3 is a line diagram showing the pressure in a fuel tank that varies with the execution of the failure diagnostic control.
Figure 4:
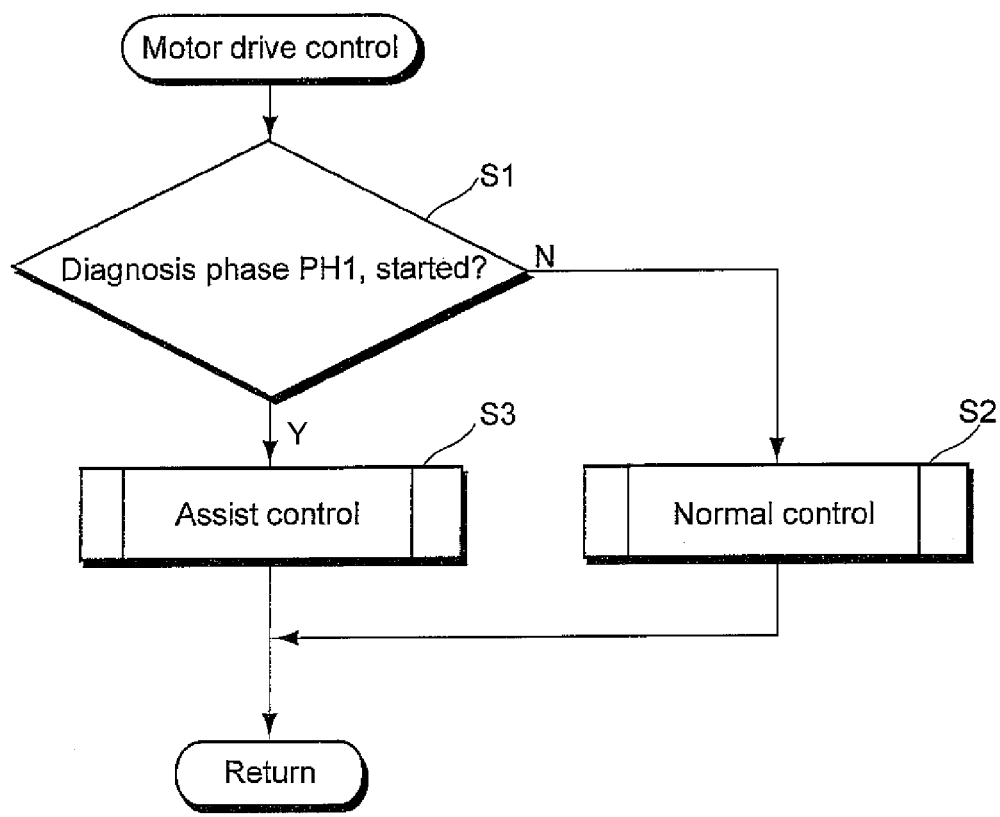
FIG. 4 is a flow chart showing an execution routine of motor drive control executed by the diagnostic control device of an embodiment according to the present invention.
Figure 5:
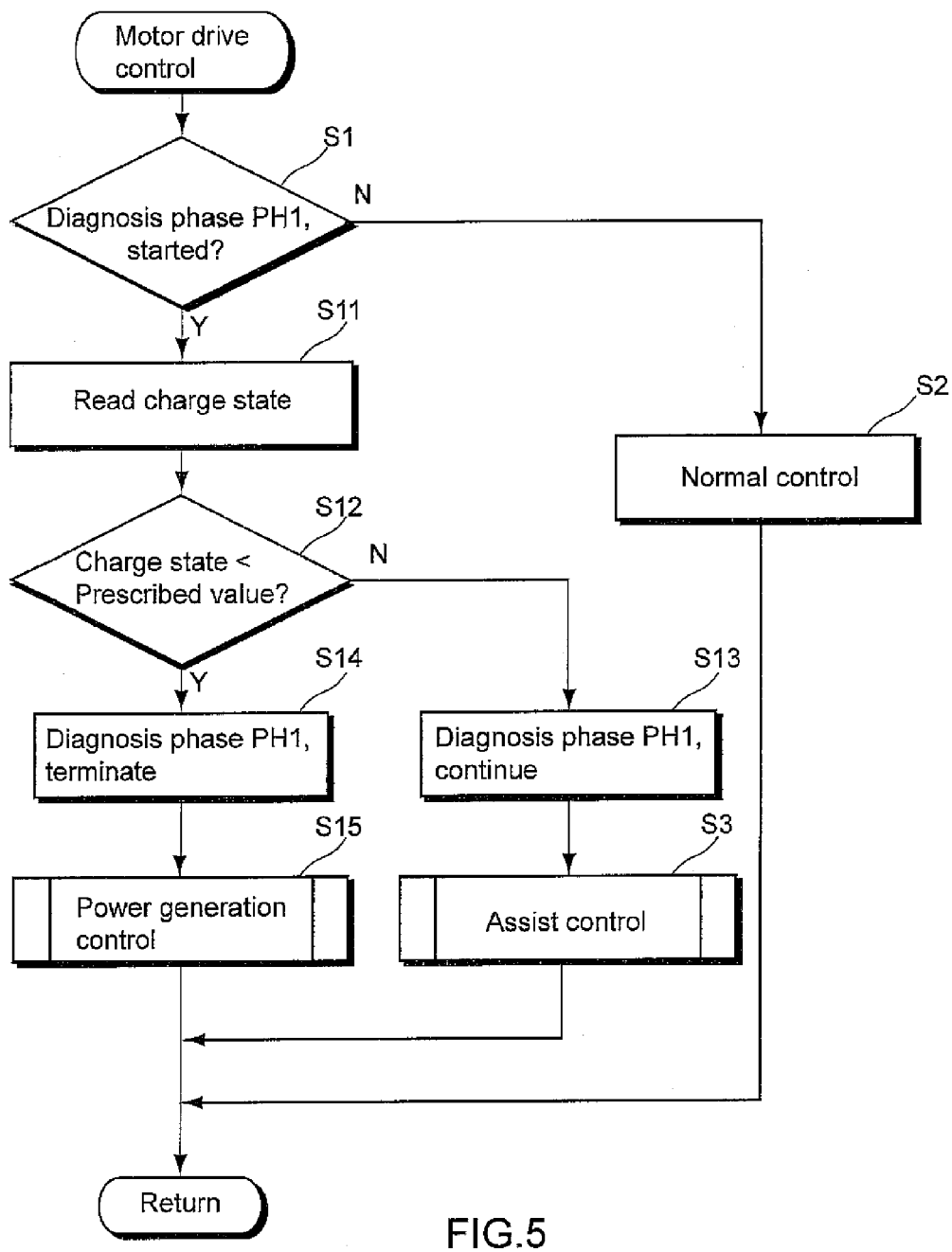
FIG. 5 is a flow chart showing an execution routine of motor drive control executed by the diagnostic control device of another embodiment according to the present invention.
Figure 6:
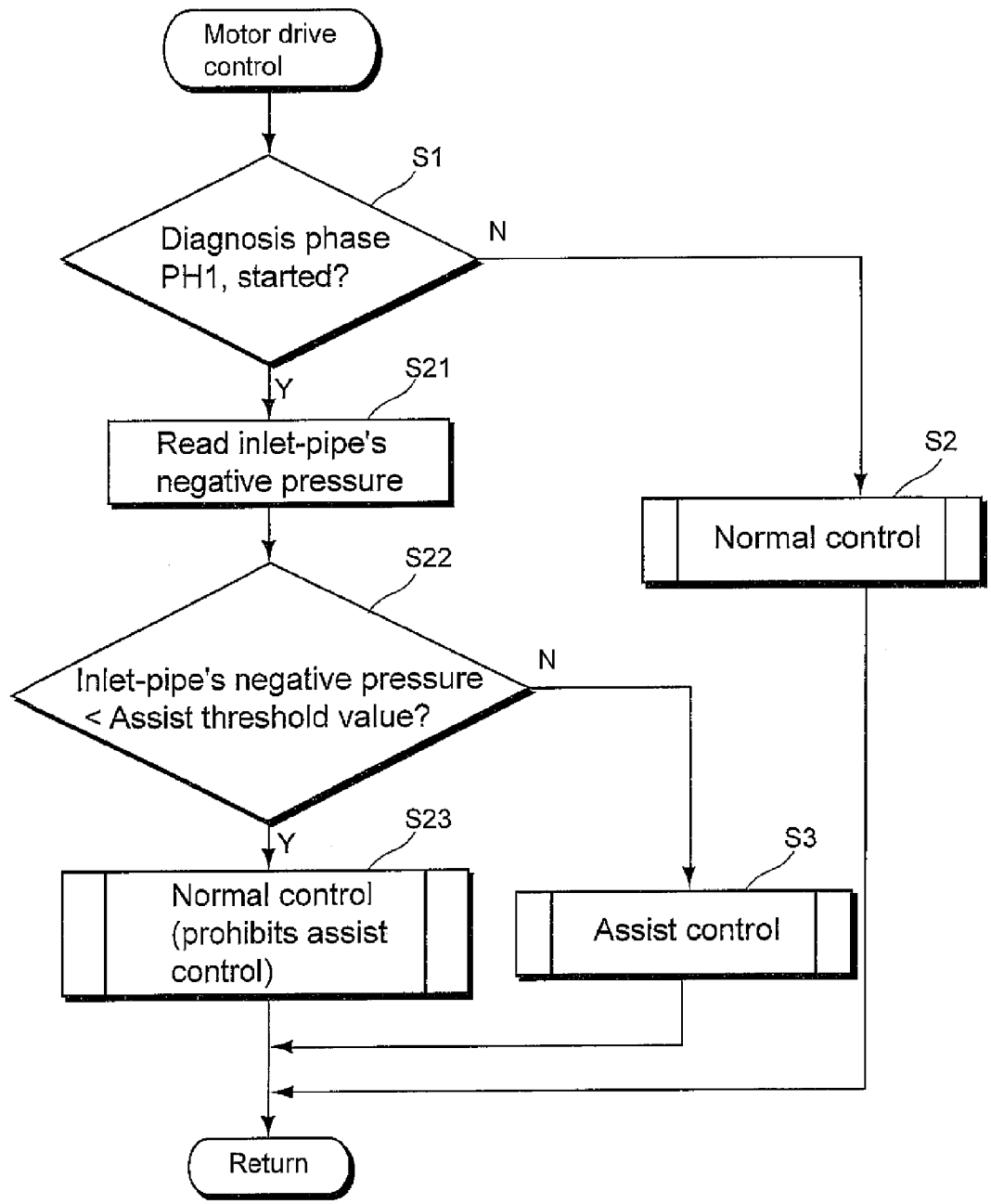
FIG. 6 is a flow chart showing an execution routine of motor drive control executed by the diagnostic control device of yet another embodiment according to the present invention.
Figure 7:
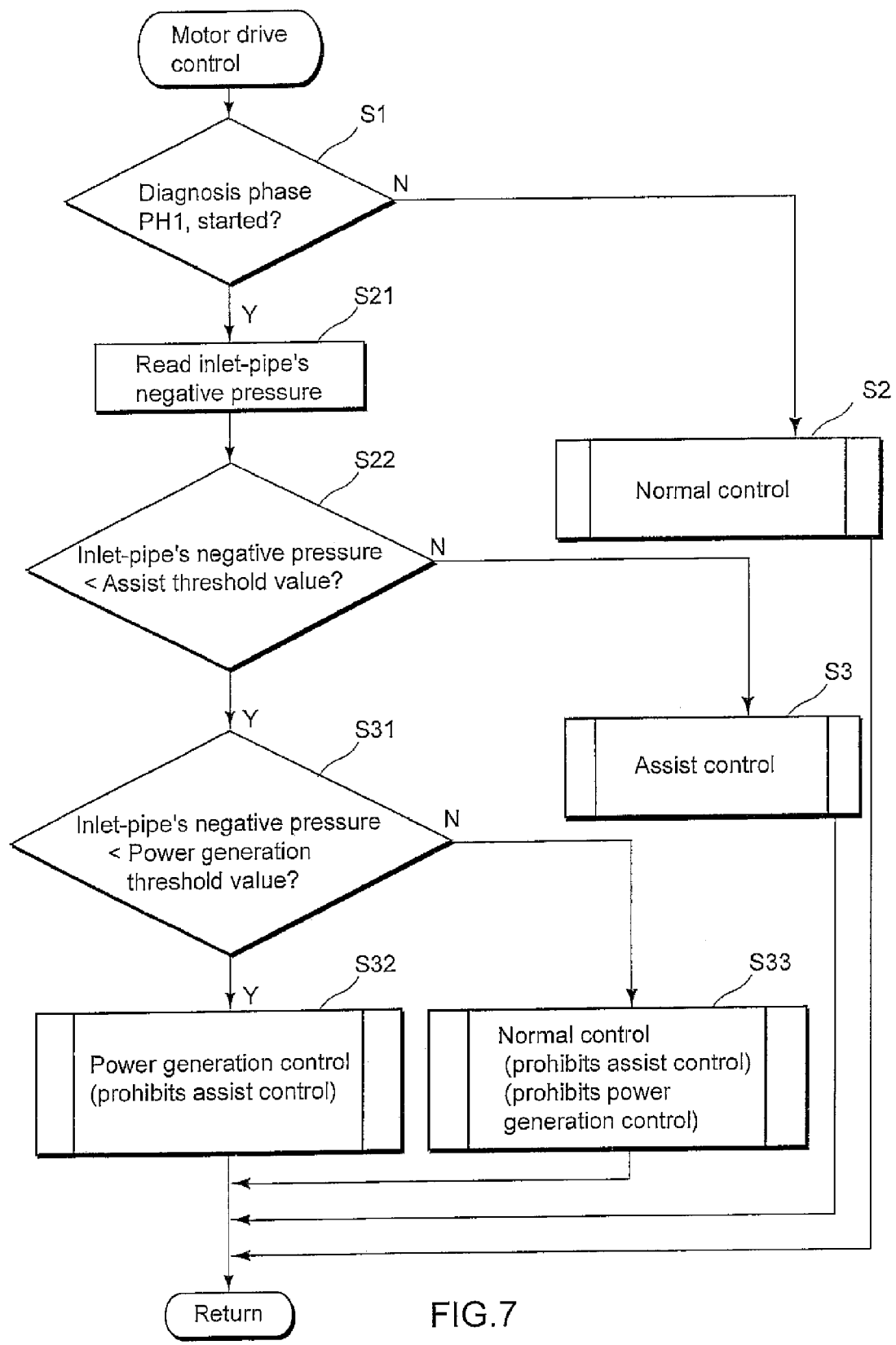
FIG. 7 is a flow chart showing an execution routine of motor drive control executed by the diagnostic control device of of yet another embodiment according to the present invention.

What is claimed is:

1. A diagnostic control device for a hybrid vehicle having an engine with an electric motor coupled to said engine, wherein said engine contains an induction system having an inlet pipe and is connected to a fuel tank, comprising:

an evaporation process mechanism for guiding fuel vapor generated in the fuel tank through a vapor flow path to the induction system of the engine;

a failure diagnosis unit that introduces negative-pressure of the inlet-pipe into the vapor flow path of said evaporation process mechanism for performing a failure diagnosis of the evaporation process mechanism based on pressure changes in said vapor flow path; and a motor control unit for driving said electric motor to assist the engine so as to relieve engine load when introducing negative-pressure of the inlet pipe into said vapor flow path;

wherein said motor control unit prohibits driving of the electric motor to assist the engine when the inlet-pipe's negative pressure obtained by said engine alone goes below a prescribed assist threshold-value; and wherein said motor control unit makes the electric motor drive for electricity generation when the inlet-pipe's negative pressure obtained by said engine alone goes below a power-generation threshold-value which is on a lower side of the prescribed assist threshold-value.

2. The diagnostic control device for a hybrid vehicle of claim 1, wherein said motor control unit prohibits driving of the electric motor to assist the engine when the charge state of an electric storage device that supplies electric-power to said electric motor goes below a prescribed value.

* * * * *